United States Patent [19]

Hirabayashi et al.

[11] 4,367,591

[45] Jan. 11, 1983

[54] FITTING DEVICE

[75] Inventors: Hisaaki Hirabayashi; Koichi Sugimoto, both of Yokohama, Japan

[73] Assignee: Hitachi, Ltd., Tokyo, Japan

[21] Appl. No.: 184,915

[22] Filed: Sep. 8, 1980

[30] Foreign Application Priority Data

Sep. 7, 1979 [JP] Japan ................. 54-114197

[51] Int. Cl.³ .................. B25G 3/00; F16D 1/00; F16G 11/00
[52] U.S. Cl. ................. 33/169 C; 33/185 R; 403/13; 403/52
[58] Field of Search .......... 403/13; 33/169 E, 185 R, 33/180 R

[56] References Cited

U.S. PATENT DOCUMENTS

| 3,871,778 | 3/1975 | Schulte | 403/410 X |
| 4,098,001 | 7/1978 | Watson | 33/169 C |
| 4,155,169 | 5/1979 | Drake et al. | 33/169 C |
| 4,202,107 | 5/1980 | Watson | 33/169 C |
| 4,283,153 | 8/1981 | Brendamour | 33/185 R X |

Primary Examiner—Wayne L. Shedd
Attorney, Agent, or Firm—Antonelli, Terry and Wands

[57] ABSTRACT

A fitting device for fitting a peg member and a hole formed in a hole member into each other including a stationary base, a movable base for supporting one of the peg member and the hole member, and a three-dimensional spatial mechanism having at least six degrees of freedom. The three-dimensional spatial mechanism includes a plurality of sliders supported on the stationary base for non-linear movements.

13 Claims, 8 Drawing Figures

FITTING DEVICE

FIELD OF THE INVENTION

This invention relates to a fitting device applicable to fitting of a shaft and a hole into each other in assembling machine parts.

DESCRIPTION OF THE PRIOR ART

Figure 1:
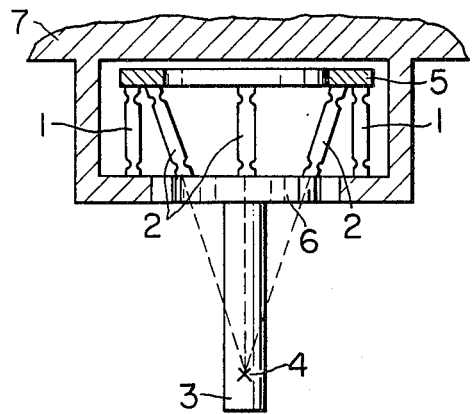
FIG. 1 is a schematic view of a fitting device of the prior art.

One type of fitting device known in the art which is disclosed in U.S. Pat. No. 4,098,001 has a mechanism composed of resilient support members as shown in FIG. 1. More specifically, the fitting device comprises vertical resilient support members 1 connecting a base 7 to a ring 5, and oblique resilient support members 2 connecting the ring 5 to a plate 6 supporting a shaft 3 to be fitted in a hole, the oblique resilient support members 2 being inclined in a direction in which extensions of the axes of the members 2 converge at a pivot 4 on the shaft 3. The fitting device of the aforesaid construction operates such that as the shaft 3 being moved downwardly is brought into contact with a chamfered portion, not shown, of the hole, the vertical resilient members 1 are deformed horizontally to effect parallel movement, to thereby move the shaft 3 and the ring 5 in such a manner that the center axis of the shaft 3 is brought into alignment with the center axis of the hole. Further downward movement of the shaft 3 enables the shaft 3 to be fitted in the hole unless the shaft 3 is inclined relative to the hole. However, in the event that the shaft 3 is inclined with respect to the hole, the oblique resilient support members 2 cause the shaft 3 to swing at the pivot 4, so that the shaft 3 is brought to a position in which its center axis is aligned with the center axis of the hole as the former is further moved downwardly. Thus fitting of the shaft 3 in the hole by the fitting device of the prior art is completed.

The prior art described hereinabove has two principal disadvantages which will be set forth hereinafter. One is that either the shaft or the hole should be formed with a chamfered portion, and that they have to be set in the region of the chamfered portion. Stated differently, fitting of the shaft in the hole is beyond the power of the fitting device of the prior art if the shaft and the hole are outside the region of the chamfered portion. The other is that although no problem is raised when one part is fitted in the other part, the prior art is unable to handle fitting of more than two parts into one another wherein the first part is assembled with the second part and then the fourth, fifth . . . and nth parts are interfitted and wherein the position in which fitting is effected successively undergoes a change, because the pivot at which the parts swing remains stationary.

SUMMARY OF THE INVENTION

This invention has been developed for the purpose of obviating the aforesaid disadvantages of the prior art. Accordingly, the invention has as its object the provision of a fitting device capable of fitting a shaft and a hole into each other both when the shaft and the hole are disposed in the region of a chamfered portion and when they are disposed slightly outside the region of the chamfered portion, wherein the hole and the shaft are automatically oriented toward each other as the shaft and the hole are moved toward each other to thereby effect fitting of the shaft and the hole into each other. The fitting device is capable of coping with the movement of the fitting position in a horizontal plane, and even if the fitting position successively moves upwardly or downwardly when the second, third . . . and nth fittings are effected following the first fitting, the pivot at which the shafts swing can move in conjunction with the movement of the fitting position.

The outstanding characteristic of the invention is that the fitting device permits the pivot at which the shaft or hole swings when fitted in the hole or shaft, respectively, to move both in a horizontal plane and in a vertical plane or in three dimensions as required, by virtue of sliders moving non-linearly and a spatial three-dimensional mechanism having at least six degrees of freedom.

DETAILED DESCRIPTION OF THE EMBODIMENTS

Figure 2:
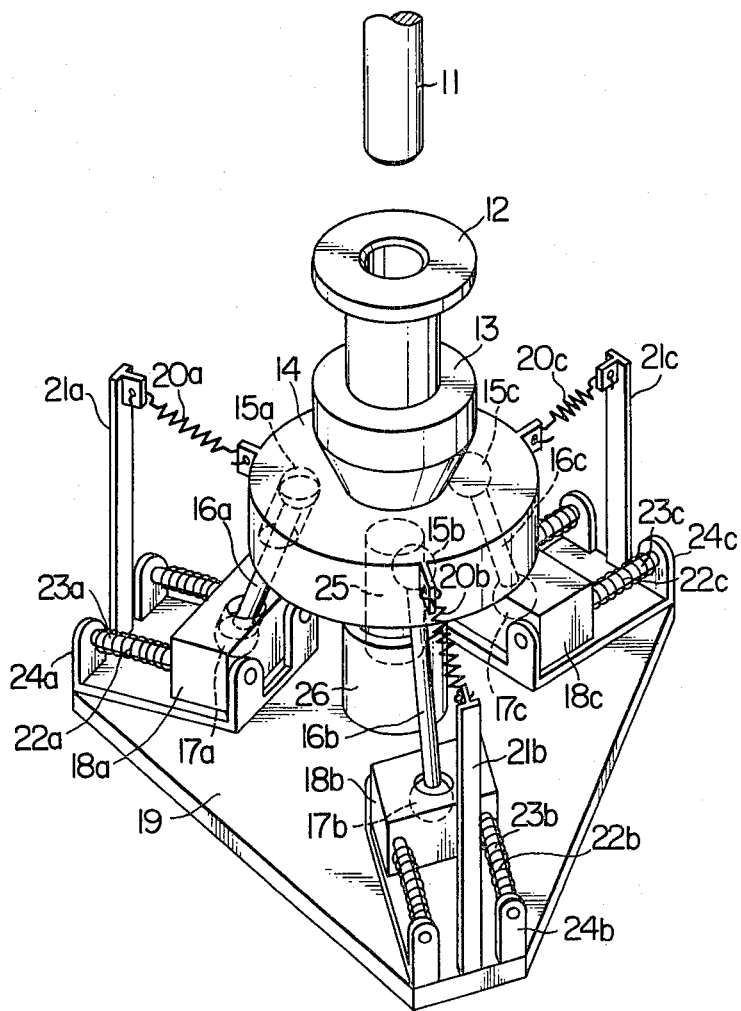
FIG. 2 is a perspective view of a fitting device comprising one embodiment of this invention.

FIG. 2 shows one embodiment of the fitting device in conformity with the invention. More specifically, the fitting device comprises a stationary base 19 having secured thereto slider guides 23a, 23b and 23c and slider stoppers 24a, 24b and 24c. Sliders 18a, 18b and 18c slide along the slider guides 23a, 23b and 23c respectively in such a manner that the sliding movements of the sliders 18a, 18b and 18c are regulated by the slider stoppers 24a, 24b and 24c respectively. Normally the sliders 18a, 18b and 18c are urged by the biasing forces of springs 22a, 22b and 22c respectively against one end of the respective stoppers 24a, 24b and 24c. Thus when a force is exerted on the sliders 18a, 18b and 18c, the sliders are prevented from moving in sliding movement if the force is below a certain value. That is, the sliders 18a, 18b and 18c act non-linearly. By rendering the springs 22a, 22b and 22c operative to perform a non-linear operation, it is possible to widen the range of fitting operations.

The sliders 18a, 18b and 18c have lower ball joints 17a, 17b and 17c connected thereto respectively and upper ball joints 15a, 15b and 15c are connected to a movable base 14. The lower ball joints 17a, 17b and 17c are connected to the upper ball joints 15a, 15b and 15c through links 16a, 16b and 16c respectively. The stationary base 19 has secured thereto upper spring retaining members 21a, 21b and 21c which are connected to the movable base 14 through upper springs 20a, 20b and 20c respectively. The movable base 14 has secured thereto an inner operation regulating member 25 and the stationary base 19 has secured thereto an outer operation regulating member 26, and the regulating members 25 and 26 regulate the movements of the movable base 14 in such a manner that the movable base 14 operates relative to the stationary base 19 only in the region of the gap between the two regulating members 25 and 26.

The resilient support system described above comprises three sets of support sections each including one of the sliders 18a, 18b and 18c, links 16a, 16b and 16c, upper springs 20a, 20b and 20c and springs 22a, 22b and 22c which are mounted between the stationary base 19 and the movable base 14.

A hole member 12 is secured to the movable base 14 through a hole member retainer 13. A shaft 11 has only to be moved downwardly to be fitted in the hole member 12.

The operation of fitting the shaft 11 in the hole member 12 by using the system of the construction shown in FIG. 2 will now be described in detail step by step.

The system shown in FIG. 2 has a three-dimensional spatial mechanism having six degrees of freedom. However, to facilitate explanation, description will be set forth by referring to FIGS. 3(A) and 3(B) showing the mechanism of FIG. 2 as a two-dimensional mechanism that could be inferred from the mechanism shown in FIG. 2.

Figure 3A:
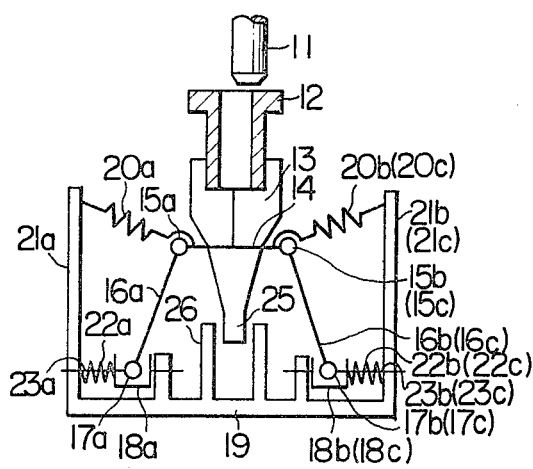
FIGS. 3(A) and 3(B) and 4(A) and 4(B) are schematic two-dimensional views in explanation of the mechanism shown in FIG. 2 and the manner of operation thereof.

Referring to FIG. 3(A), the shaft 11 is being moved downwardly in such a manner that its chamfered portion is displaced from the hole of the hole member 12.

Figure 3B:
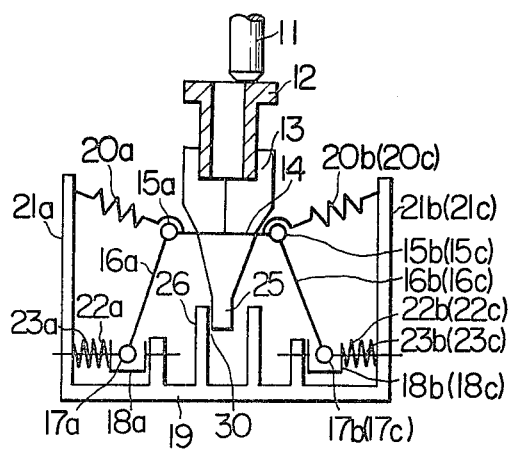

As the downwardly moving shaft 11 is brought into contact with an upper end of the hole member 12 as shown in FIG. 3(B), the sliders 18a and 18b (18c) do not move in sliding movement and non-linear movement takes place, because they are urged by the left and right springs 22a and 22b (22c) respectively to move in one direction. However, the left and right upper springs 20a and 20b (20c) are expanded and contracted at once because they are low in biasing force. Thus a 4-node linkage having one degree of freedom is formed which comprises a node consisting of the hole member 12, hole member retainer 13 and inner operation regulating member 25 acting as a unit with the movable base 14, and three nodes each consisting of the left link 16a, the right link 16b (16c) and the stationary base 19. The four nodes are connected together by four turning pairs 17a, 17b (17c), 15a and 15b (15c). Also, the movable base 14 has two links 16a and 16b (16c) between it and the stationary base 19 so that it may be instantaneously pivoted near the center axis of the hole member 12. Thus as the right side of the hole member 12 is pressed by the downwardly moving shaft 11, the movable base 14 moves clockwise in pivotal movement. However, the amount of the pivotal movement is very small, so that the point of contact between the shaft 11 and the hole member 12 is substantially constant. The pivotal movement of the movable base 14 brings the inner operation regulating member 25 into engagement with the outer operation regulating member 26 at a sliding point 30 as shown in FIG. 3(B), thereby stopping the pivotal movement of the movable base 14.

Figure 4A:
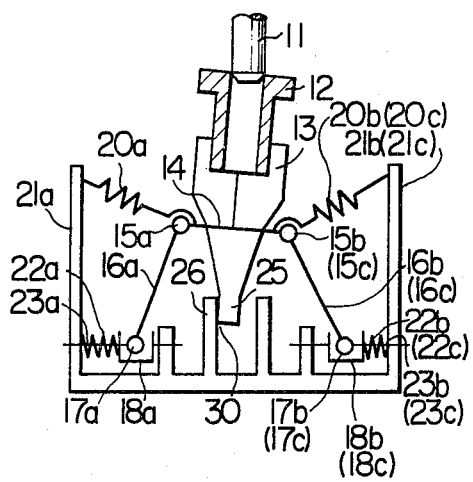

Further downward movement of the shaft 11 against the hole member 12 brings the shaft 11 and the hole member 12 in relative positions shown in FIG. 4(A). More specifically, with the shaft 11 being positioned relative to the hole member 12 as shown in FIG. 3(B), a difference is produced in the degree of inclination between the left link 16a and the right link 16b (16c) and the latter 16b (16c) has a larger degree of inclination. Consequently, a higher force is exerted on the right link 16b (16c) than on the left link 16a, with a result that a force urging the right slider 18b (18c) to move in sliding movement becomes higher than a force urging the left slider 18a to move in sliding movement. Finally the right slider 18b (18c) initiates its sliding movement, as shown in FIG. 4(A).

Figure 4B:
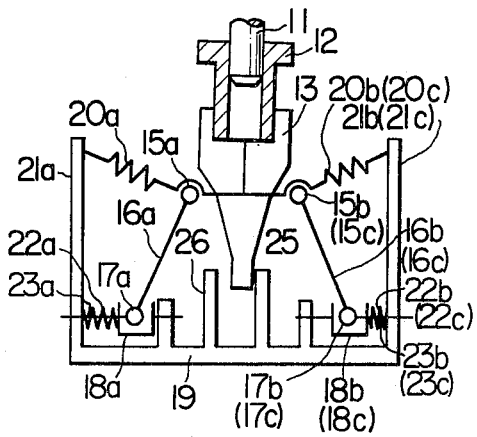

At this time, a four-node linkage having one degree of freedom is formed which comprises four nodes distinct from the four nodes described previously and connected together by four kinetic pairs consisting of the left upper turning pair 15a, left lower turning pair 17a, a turning pair at the sliding point 30 and a sliding pair at the sliding point 30. By the action of the linkage, the hole member 12 begins to move counterclockwise in pivotal movement until it is brought into alignment with the shaft 11. Thus the shaft 11 faces the inlet of the hole of the hole member 12 as shown in FIG. 4(A). Further downward movement of the shaft 11 brings into action a four-node linkage of one degree of freedom comprising four pairs 18a, 18b (18c), 15a and 15b (15c) as shown in FIG. 4(B), so long as the displacement of the shaft 11 from the hole of the hole member 12 is within a tolerance of the gap between the inner operation regulating member 25 and the outer operation regulating member 26. This brings the shaft 11 into agreement with the hole of the hole member 12 in posture, and fitting of the shaft 11 in the hole of the hole member 12 takes place. Thus the system shown in FIG. 2 enables a shaft to be automatically fitted in a hole of a hole member even if the hole is displaced from the range of the chamfered portion of the shaft at the time of initial positioning relative to each other.

It is to be understood that the conditions shown in FIGS. 3(B) and 4(B) do not necessarily occur in the indicated order at all times. That is, if no displacement exists between the shaft 11 and the hole of the hole member 12, then the condition shown in FIG. 3(A) shifts to the condition shown in FIG. 4(B) by skipping the conditions shown in FIGS. 3(B) and 4(A).

The fitting device according to the invention enables the aforesaid operations described as being performed in two dimensions to be carried out in three dimensions. Thus the fitting device is capable of automatically fitting the shaft 11 in the hole of the hole member 12 even if the shaft 11 is displaced from the hole not only in two dimensions but also in three dimensions.

As can be appreciated from the foregoing description, the embodiment described above may be modified in such a manner that, by utilizing the aforesaid two types of 4-node linkage having one degree of freedom which functions skillfully, the three-dimensional spatial mechanism having six degrees of freedom which supports the hole member 12 is moved upwardly relative to the shaft 11 that remains stationary, or the three-dimensional spatial mechanism having six degrees of freedom which supports the hole member 12 is disposed at a higher level while the shaft 11 is located at a lower level. Also, the shaft 11 and the three-dimensional spatial mechanism having six degrees of freedom which supports the hole member 12 may be both disposed in a horizontal plane so that the shaft or the hole member may be moved horizontally toward the other.

Figure 5:
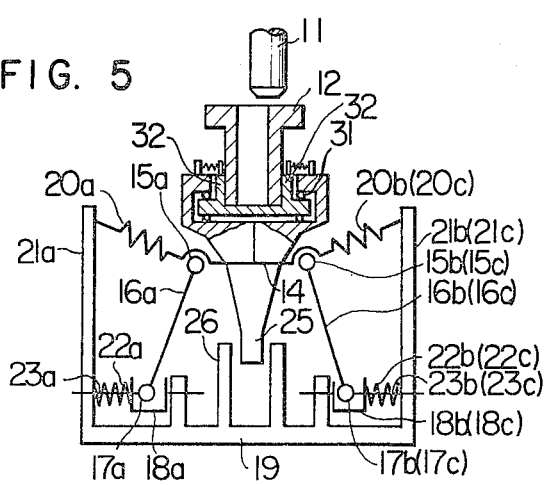
FIG. 5 is a fragmentary sectional two-dimensional view of a modification of the fitting device shown in FIG. 2.

In the embodiment shown and described hereinabove, the hole member retainer 13 has been described as being secured to the movable base 14. However, means allowing a fine horizontal movement of the hole member retainer 13 relative to the movable base 14, such as a slide bearing 31 shown in FIG. 5, may be mounted between the hole member retainer 13 and the slide member 14, to accommodate a greater amount of displacement of the shaft 11 from the hole of the hole member 12 than that shown in FIG. 3(A). In the modification illustrated in FIG. 5, the hole member 12 is received in a socket member 32 which is supported by the retainer 13 through the slide bearing 31 so that the hole member 12 is horizontally movable relative to the retainer 13. This enables fitting of the shaft 11 in the hole of the hole member 12 to be effected with increased smoothness. Also, if the gap between the inner operation regulating member 25 and the outer operation regulating member 26 is increased to enable fitting of the shaft 11 in the hole of the hole member 21 to be effected when the amount of displacement of the shaft 11 in the horizontal direction from the hole of the hole member 12 is greater than shown in FIG. 3(A), the degree of inclination of the movable member 14 would become so high that a force of higher magnitude would have to be exerted on the shaft 11 to restore the movable base 14 to its original position by moving the sliders 18b (18c) merely by the force of downward movement of the shaft 11. At the same time, contact resistance between the shaft 11 and the hole of the hole member 12 would increase, thereby causing scratching of the wall of the hole by the shaft to develop. This phenomenon could be avoided by the provision of means for allowing a slight horizontal movement to take place between the hole member retainer 13 and the movable base 14.

From the foregoing description, it will be appreciated that the invention is capable of coping with the movement of a fitting point not only in two dimensions but also in three dimensions which has hitherto been unachievable by the prior art.

Experiments were conducted on the ability of the fitting device according to the invention to accommodate displacements in a horizontal plane and a vertical plane. In fitting a shaft of a diameter of 16 mm in holes having tolerances of $$^{+0.030}_{+0.012} \text{ mm},$$

fitting of the shaft in the holes was effected even if there was a displacement of about ±3 mm from the region of the chamfered portion in a horizontal plane. In a vertical plane, displacements up to 30 mm were accommodated, to enable the shaft to be fitted in the hole without fail.

Figure 6:
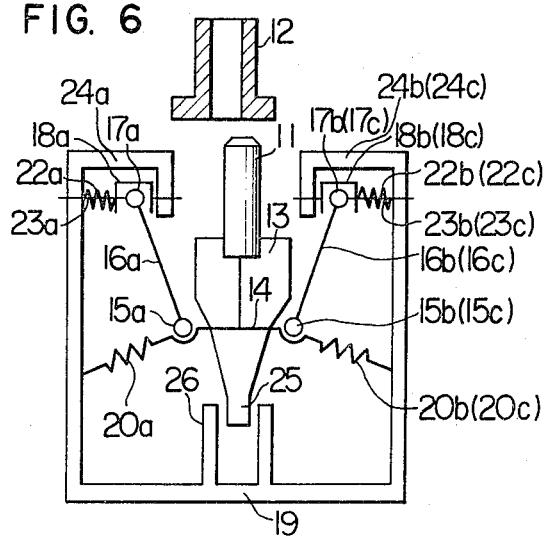
FIG. 6 is a fragmentary two-dimensional view of a second embodiment of the present invention.

Referring to FIG. 6, there is illustrated a second embodiment of the present invention in which a shaft 11 is supported by a movable base 14 through a retainer 13, and a hole member 12 is adapted to be fitted over the shaft 11. In the embodiment shown in FIG. 6, the same reference characters are applied to parts and members common to the embodiment illustrated in FIG. 2.

The fitting device according to the second embodiment of the present invention comprises a stationary base 19, a movable base 14 having mounted thereon a retainer 13 for a shaft or peg member 11, and a spatial mechanism having at least six degrees of freedom for connecting the movable base 14 to the stationary base 19 such that the movable base 14 is movable relative to the stationary base 19. The stationary base 19 includes three vertical post, only two shown, disposed around an axis of the shaft 11 in circumferentially equidistantly spaced relation. The spacial mechanism comprises three stoppers 24a, 24b, 24c each mounted on the tops of the posts, respectively. A slider 18a, 18b, 18c is slidably mounted on each stopper and movable thereon toward and away from the shaft 11 in a non-linear manner. A spring 22a, 22b, 22c is disposed between each slider 18a, 18b, 18c and the radially outward end of each stopper 24a, 24b, 24c and biases the slider toward the shaft and against the radially inward end of each stopper. A link member 16a, 16b, 16c has one end thereof connected to each slider through a ball joint 17a, 17b, 17c and the other end connected to the movable base 14 through a ball joint 15a, 15b, 15c.

The spatial mechanism further includes three springs 20a, 20b and 20c, only two shown, disposed around the axis of the shaft 11 in circumferentially equidistantly spaced relation. The springs 20a, 20b and 20c have their one ends connected to the stationary base 19 and the other ends connected to the movable base 14 for resiliently retaining the movable base in position. The spatial mechanism further includes an operation regulator which comprises a solid cylindrical member 25 having one end thereof secured to the movable base 14, and a socket member 26 secured to the stationary base 19 and having a cylindrical bore for receiving the other end of the cylindrical member 25 with an annular clearance being normally left between the members 25 and 26.

The operation of the fitting device comprising the second embodiment shown in FIG. 6 is substantially the same as that of the embodiment shown in FIG. 2, except that in the second embodiment the shaft or peg member 11 is supported by the movable base 14 and the hole member 12 is adapted to be fitted over the shaft 11. Accordingly, descriptions on the operation of the fitting device shown in FIG. 6 will be omitted.

The fitting device of the aforesaid construction would have high practical value because the device, when used in assembling of parts of an automotive vehicle, would enable automatic fitting of an axle in a wheel formed with an opening.

What we claim is:

1. A fitting device for orienting one of a peg member and a hole formed in a hole member, comprising:
   a stationary base;
   a movable base for supporting said one of said peg member and said hole member; and
   a three-dimensional spatial mechanism having at least six degrees of freedom connecting said movable base to said stationary base, said three-dimensional spatial mechanism comprising at least three sliders supported on said stationary base for movements in a direction substantially perpendicular to the axis of said one of said peg member and said hole member, at least three links each connected at one end thereof to one of said at least three sliders and at the other end thereof to said movable base through a turning pair, operation regulating means for allowing rotational movement of said movable base relative to said stationary base and for limiting movement of said movable base relative to said stationary base in a direction substantially perpendicular to the axis of said one of said peg member and said hole member in a predetermined range, and means for resiliently retaining said movable base in a predetermined position.

2. A fitting device as claimed in claim 1, further comprising means for connecting said one of said peg member and said hole member to said movable base in a manner to allow a fine movement of said one of said peg member and said hole member relative to the movable base in a direction normal to the axis of said one of said peg member and said hole member.

3. A fitting device as claimed in claim 1 or 2, wherein said three-dimensional spatial mechanism further comprises a plurality of pairs of springs of non-linear spring characteristics with each pair of springs connecting one of said sliders to said stationary base.

4. A fitting device as claimed in claim 1 or 2, wherein said turning pair comprises a ball joint.

5. A fitting device as claimed in claim 1 or 2, wherein said operation regulating means comprises a cylindrical member connected at one end thereof to one of said movable base and said stationary base, and a bore formed in the other of said movable base and said stationary base, said bore receiving therein the other end of said cylindrical member in a manner to define an annular clearance between said bore and said cylindrical member.

6. A fitting device as claimed in claim 1 or 2, wherein said resiliently retaining means comprises springs each being connected at one end thereof to said stationary base and at the other end thereof to said movable base.

7. A fitting device as claimed in claim 1 or 2, wherein said sliders are disposed on said stationary base around the axis of said one of said peg member and said hole member in a circumferentially, equidistantly spaced relation to one another.

8. A fitting device as claimed in claim 5, wherein said sliders are disposed on said stationary base around the axis of one of said peg member and said hole member in a circumferentially, equidistantly spaced relation to one another, and wherein said bore is formed in said stationary base in alignment with said one of said peg member and said hole member.

9. A fitting device as claimed in claim 7, wherein said three-dimensional spatial mechanism further comprises stoppers each associated with one of said sliders for restricting movements thereof toward and away from the axis of said one of said peg member and said hole member.

10. A fitting device for orienting one of a peg member and a hole formed in a hole member, comprising:

a stationary base;
a movable base for supporting said one of said peg member and said hole member; and
a three-dimensional spatial mechanism connecting said movable base to said stationary base, said three-dimensional spatial mechanism comprising at least three sliders supported on said stationary base and movable independently of each other in a direction substantially perpendicular to an axis of said one of said peg member and said hole member, and at least three rotational interconnection elements respectively connected between said sliders and said movable base, said interconnection elements being inclined toward a fitting position where said one of the peg member and said hole of said hole member receives a member to be fitted thereto;
whereby said fitting position can be moved at least in an axial direction relative to said movable base in accordance with the outward movement of each of said sliders.

11. A fitting device as claimed in claim 10, wherein said three-dimensional spatial mechanism has at least six degrees of freedom for individual movement of each of said sliders.

12. A fitting device as claimed in claim 10, wherein said three-dimensional spatial mechanism further comprises a plurality of pairs of springs of non-linear spring characteristics with each pair of springs acting between one of said sliders and said stationary base.

13. A fitting device as claimed in claim 10 or 11 or 12, wherein said rotational interconnection elements comprise links connected respectively at opposite ends to said sliders and movable base by ball joints.

* * * * *